United States Patent
Bender

(10) Patent No.: US 8,172,926 B2
(45) Date of Patent: May 8, 2012

(54) AEROSOL SEPARATOR IN $CO_2$ RECOVERY SYSTEM

(75) Inventor: Harald Bender, Freising (DE)

(73) Assignee: Krones AG, Neutraubling (DE)

( * ) Notice: Subject to any disclaimer, the term of this patent is extended or adjusted under 35 U.S.C. 154(b) by 1099 days.

(21) Appl. No.: 11/340,293

(22) Filed: Jan. 26, 2006

(65) Prior Publication Data

US 2006/0185519 A1    Aug. 24, 2006

(30) Foreign Application Priority Data

Feb. 16, 2005  (EP) .................................... 05003306

(51) Int. Cl.
*B01D 47/00* (2006.01)

(52) U.S. Cl. ................ 95/199; 95/211; 95/214; 95/223; 95/224

(58) Field of Classification Search .................... 95/236, 95/211, 199, 214, 223, 224; 55/467; 96/290, 96/299, 296–297, 322, 325

See application file for complete search history.

(56) References Cited

U.S. PATENT DOCUMENTS

| | | | | |
|---|---|---|---|---|
| 3,733,789 A | * | 5/1973 | Rebours | 96/297 |
| 4,140,501 A | * | 2/1979 | Ekman | 96/232 |
| 5,120,442 A | * | 6/1992 | Kull et al. | 210/621 |
| 5,425,929 A | | 6/1995 | van Oeveren et al. | |
| 6,143,049 A | * | 11/2000 | Gieseke et al. | 55/385.3 |
| 6,355,076 B2 | * | 3/2002 | Gieseke et al. | 55/330 |
| 7,172,639 B2 | * | 2/2007 | Martynowicz et al. | 55/315 |

FOREIGN PATENT DOCUMENTS

| | | |
|---|---|---|
| DE | 890 633 | 9/1953 |
| DE | 1 223 330 | 8/1966 |
| DE | 197 55 213 A1 | 8/1998 |
| DE | EP 1308502 A1 * | 10/2002 |
| DE | EP-1308502 A1 * | 5/2003 |
| EP | 0 646 756 A1 | 4/1995 |
| EP | 1 308 502 A1 | 5/2003 |
| GB | 1566877 * | 10/1976 |
| GB | 1 566 877 | 5/1980 |
| JP | 2000225183 | 1/2001 |
| RU | 2237615 | 10/2004 |
| WO | WO 03/011757 A1 | 2/2003 |

OTHER PUBLICATIONS

European Search Report No. EP 05 00 3306, dated Jun. 9, 2005.
Official Notification of Change of the Applicant, dated Nov. 15, 2005.

* cited by examiner

*Primary Examiner* — Duane Smith
*Assistant Examiner* — Ives Wu
(74) *Attorney, Agent, or Firm* — Marshall, Gerstein & Borun LLP

(57) ABSTRACT

An aerosol separator is arranged before a $CO_2$ compressor to prevent wear and damage in $CO_2$ recovery systems for the recovery of $CO_2$ arising during fermentation using a compressor.

4 Claims, 2 Drawing Sheets

AEROSOL SEPARATOR IN $CO_2$ RECOVERY SYSTEM

CROSS-REFERENCE TO RELATED APPLICATIONS

The present application claims the benefit of priority of European Patent Application No. 05003306.7 filed Feb. 16, 2005. The entire text of the priority application is incorporated herein by reference in its entirety.

FIELD OF DISCLOSURE

The invention relates to a system and method for the recovery of $CO_2$ arising in fermentation.

BACKGROUND OF THE INVENTION $CO_2$ recovery systems or the corresponding methods are currently used in breweries to recover $CO_2$ arising during the main fermentation so that it can then be used in other processes such as, for example, prestressing and emptying storage tanks under pressure, carbonating, bottling, etc.

During the $CO_2$ recovery often damage can be observed in particular with increased use of high gravity methods in the fermentation section, i.e., during brewing with high wort concentrations, and with the optimisation of the net content of the fermenters (reduction of the unfilled space). In this respect also, massive corrosion phenomena appear on the associated pipework, apparatus and machinery (usually pitting). The functional capability, in particular of the $CO_2$ compressors, is substantially impaired due to deposits of aerosols and their constituent substances. This leads to a reduction in the service life of the operational valves and to medium-term damage of glands and piston rods, which can lead to the failure of the complete system.

SUMMARY OF THE DISCLOSURE

The object of this disclosure is therefore to provide a $CO_2$ recovery system for the recovery of $CO_2$ arising in fermentation and an appropriate method with which damage in the associated pipework, apparatus and machinery of the recovery system can be prevented.

The aerosol separator, with which the $CO_2$ gas loaded with aerosols is cleared of aerosols, is arranged before the $CO_2$ compressor. As a result, it is possible to prevent aerosols, together with constituent substances carried along with them, from settling in the system parts of the $CO_2$ recovery system. These types of aerosols arise as constituent substances in $CO_2$ gas, particularly with the use of the high gravity method, in the fermentation section and during the optimisation of the net content of the fermenter. Aerosols are the finest drops of liquid with a diameter between 12 μm and almost 0 μm. These aerosols carry along constituent substances of the fermenting mixture with the $CO_2$ gas flow to the $CO_2$ recovery system. Such constituent substances include sugar, hydrocarbons, organic components, which carbonise in the compressor, noticeably damaging it and the following components of the recovery system as described above. However, through the use of the aerosol separator before the compressor, this sort of damage can be prevented.

According to a preferred embodiment, the aerosol separator comprises a watering device to water the aerosol-loaded $CO_2$ gas during the separation. Normally, aerosol separators operate "dry". However, since the substances carried along by the aerosols, in particular various sugars, etc., are sticky, watering is necessary. The water can collect with the separated aerosols and their constituent substances on the floor of the aerosol separator where it can be level-controlled and extracted.

In a preferred type and manner, the watering device comprises at least one nozzle to spray the aerosol-loaded $CO_2$ gas, or the separation elements with water.

The aerosol separator comprises at least one flat separation element through which the aerosol-loaded $CO_2$ gas flows. As this occurs, the watering device wets at least one separation element with water.

According to a preferred embodiment of the disclosure, a gas washer is arranged before the aerosol separator. A conventional washer of this type, i.e., a spray washer, washer with integral structured packages (e.g., Sulzer Mella Pach, etc.), or washer with packed bed fillings (e.g., Pall rings, Raschig rings, etc.), cannot remove aerosols from the $CO_2$ gas flow, but they prevent excessive loading of the aerosol separator through an appropriate preliminary purification. In particular, the gas washer clears the $CO_2$ of water-soluble contaminants.

According to a special embodiment, a $CO_2$ gas balloon, which provides temporary storage, is arranged between the aerosol separator and the $CO_2$ compressor. The arrangement of the $CO_2$ gas balloon between the aerosol separator and the $CO_2$ compressor enables gas which has already been purified to be temporarily stored.

BRIEF DESCRIPTION OF THE DRAWINGS

The disclosure is explained in more detail in the following with reference to the following figures.

DETAILED DESCRIPTION OF THE DISCLOSURE

The $CO_2$ recovery system according to the disclosure is used during the brewing of beer.

Figure 2:
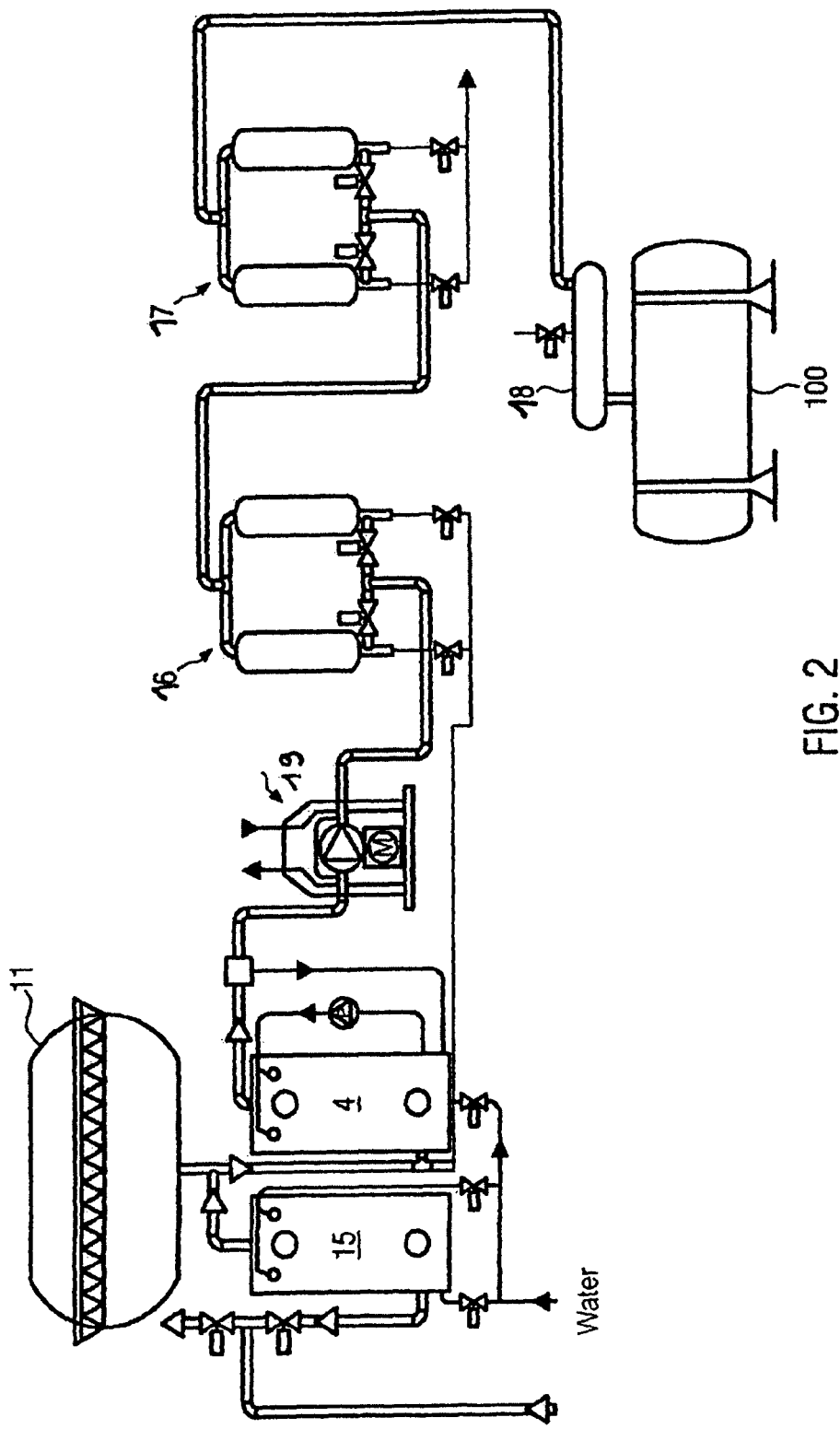
FIG. 2 shows a $CO_2$ recovery system as is known from the state of the art.

FIG. 2 shows an example of a $CO_2$ recovery system from the prior art. Here, the $CO_2$ is removed from the fermentation vessels (not illustrated) via appropriate $CO_2$ extraction devices and first passed to a froth separator 15 which is used to retain any froth that has been carried along. The $CO_2$ gas collects in a large $CO_2$ gas container, a so-called $CO_2$ gas balloon 11, which acts as a buffer for the collection of the gas. The $CO_2$ is cleared of water-soluble contaminants in the gas washer 4. A $CO_2$ compressor 19 compresses the $CO_2$ in a known manner to a liquefying pressure in a range from 15 to 22 bar. The liquefied $CO_2$ is then subjected to drying and purification (or vice versa), whereby here the $CO_2$ is first passed to a dryer 16 and then to a filter 17. The compressed $CO_2$ then condenses at low temperatures in a $CO_2$ liquefaction system and is then temporarily stored in a $CO_2$ storage tank 100 from where it can also be taken for immediate use in the brewery.

With the $CO_2$ recovery system according to the disclosure initially, as in the state of the art, aerosol-loaded $CO_2$ gas is removed from the fermentation tun via a $CO_2$ extraction device (not illustrated). The extracted $CO_2$ gas is loaded with aerosols. The exact location at which the aerosols are produced has not been scientifically determined. It is assumed however that they arise during sudden changes of pressure caused by gas bubbles as they pass through the surface of the liquid in the fermenter.

With the increased use of the high gravity method in the fermentation section, i.e., with the use of high percentage wort (greater than 12%), these sorts of aerosols occur more frequently in the $CO_2$ gas. Also, increased aerosols have been observed during the optimisation of the net content of the fermenter (reduction of the unfilled space).

According to the disclosure, the aerosol-loaded $CO_2$ gas is initially fed to a conventional preliminary washer 4 via an appropriate feed line 9. A conventional gas washer is taken to be, for example, a spray washer, a washer with integral structured packages (e.g., Sulzer-Mella Pach) and washers with packed-bed fillings (e.g., Pall rings, Raschig rings). The gas washer 4 removes water-soluble contaminants from the $CO_2$. The contaminants which are washed out can be extracted through the valve 13 from the lower end of the gas washer 4. The washed-out contaminants can be extracted, controlled in level by appropriate level sensors/switches LSH (high level—valve 13 open) and LSL (low level—valve 13 closed). A mechanical floatation valve (WC flushing principle) is also possible.

From the output 10 of the gas washer 4, the prepurified $CO_2$ gas, which is still however loaded with aerosols, is passed to the aerosol separator 1 via the feed line 5. Aerosol separators are in widespread use in chemical engineering, e.g., in the cleaning of flue gases or in the removal of solvents from airflows. This type of aerosol separator consists at least of one flat separator element 2, which is arranged in a container 20. With the embodiment illustrated in FIG. 1, two tubular elements 2a, 2b are, for example, arranged in the container. The element walls here consist of a synthetic fabric. The elements are fitted upright in the container 20. The $CO_2$ gas to be purified is passed into the elements 2a, b and leaves the elements in a radial direction.

When flowing through the elements, due to specific mechanisms, such as for example the diffusion effect, inertial separation and inhibiting effects, the aerosols, including the substances carried along with them, are removed from the $CO_2$ gas. The $CO_2$ gas can leave the separator 1 more or less free of aerosols via the outlet 6. The aerosol separator facilitates the removal of almost 100–% of all droplets>3 μm to 99–% of all droplets<3 μm in the aerosol.

The embodiment described in connection with FIG. 1 for an aerosol separator is only an example. The elements do not have to be formed tubular, but rather they can be formed, for example, as filter mats through which the aerosol-loaded $CO_2$ gas flows. The separator element also does not have to be formed from a synthetic fabric, but can, for example, be formed from a glass fiber fabric or a synthetic needle felt, for example, a polyester needle felt or from a fleece.

Figure 1:
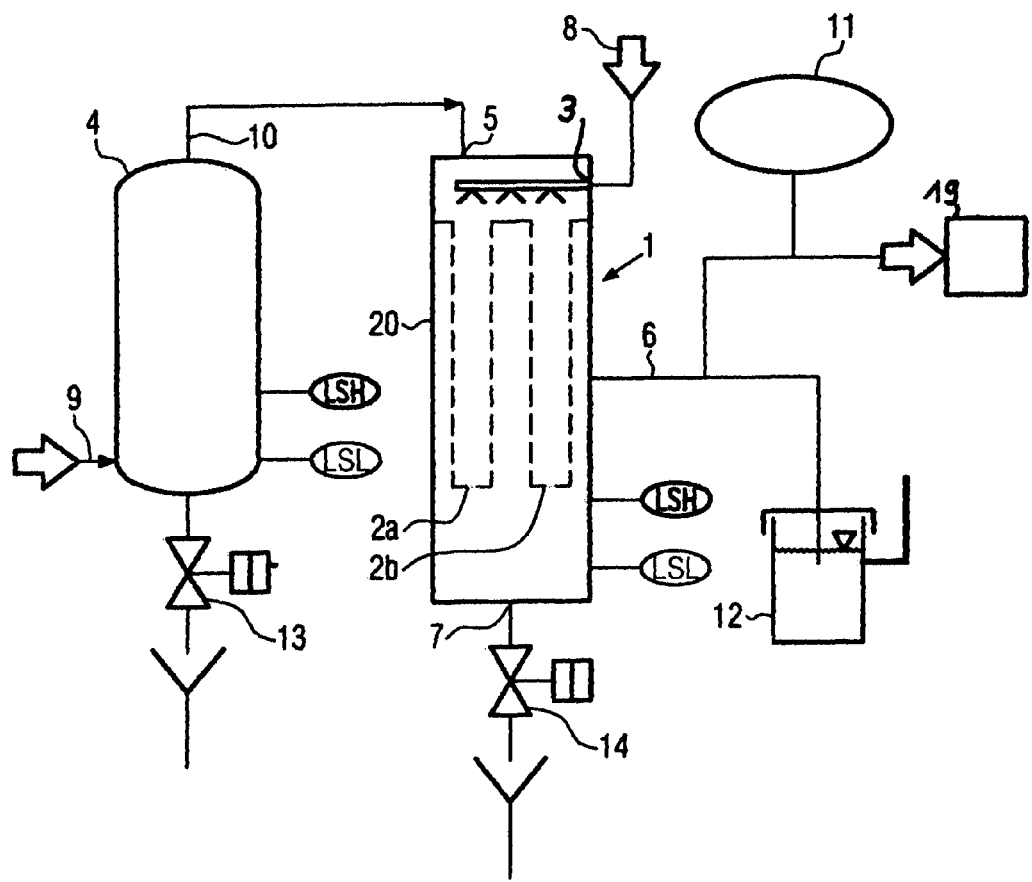
FIG. 1 shows the schematic layout of an embodiment of the invention.

Since the substances carried along by the aerosols during the $CO_2$ recovery are sticky (the various sugars, etc., already quoted), it is advantageous if, as illustrated in FIG. 1, a watering device 3 is provided. The watering device 3 is provided in the housing 20 of the aerosol separator 1. Here, the watering device 3 exhibits a feed 8 for water, and a number of nozzles, which spray water onto the separator elements 2a, 2b. The water then collects with the separated aerosols and their constituent substances on the floor of the container and can be extracted under level control from there via a drain 7 and a suitable valve 14. As described in connection with the gas washer 4, here appropriate level sensors/switches LSH (high level—valve 14 open) or LSL (low level—valve 14 closed) can be provided.

$CO_2$ gas, cleared of aerosols, can be passed to a $CO_2$ intermediate store, here a $CO_2$ balloon 11, via the outlet 6. The purified $CO_2$ gas can then be passed to the $CO_2$ compressor 19, which compresses the $CO_2$ gas as described in conjunction with the state of the art, from the outlet 6 of the aerosol separator 1 or alternatively from the $CO_2$ balloon 11. Furthermore, the device can also, as described in conjunction with the state of the art, comprise a device for purifying and drying the compressed, cooled $CO_2$ gas, as well as a $CO_2$ liquefaction system and a $CO_2$ storage tank. As can be seen from FIG. 1, the device here also comprises over- and underpressure protection 12 for the $CO_2$ balloon operation.

Through the use of the aerosol separator 1, in addition to the gas washer 4, the $CO_2$ gas, cleared of water-soluble constituents, can also be cleared of aerosols and the constituent substances carried along with them, so that no aerosols and constituent substances transported with them can settle in the recovery system. In particular, it is possible to prevent damage occurring due to the deposition of such constituent substances in the following parts of the $CO_2$ recovery system. Examples of such damage are massive corrosion phenomena in pipework, apparatus and machinery (usually pitting), impairment of the functional capability of the $CO_2$ compressor 19, drastic reduction in the service life of the operating valves and medium-term damage to glands and piston rods, which can lead to a total breakdown.

The invention claimed is:

1. Method of recovering $CO_2$ from aerosol-loaded $CO_2$ arising from a fermentation using high percentage wort greater than 12%, the method comprising feeding the aerosol-loaded $CO_2$ gas to an aerosol separator before compressing and clearing of aerosols from the aerosol-loaded $CO_2$, wherein the $CO_2$ gas loaded with the aerosol is passed through a gas washer before the aerosol separation.

2. Method according to claim 1, wherein the aerosol-loaded $CO_2$ or the at least one separation element is watered during the aerosol separation.

3. Method according to claim 1, wherein the $CO_2$ gas is passed to a $CO_2$ balloon before being compressed.

4. Method of claim 1, wherein the aerosol separator has at least one separation element through which the aerosol-loaded $CO_2$ gas flows, and the at least one separation element is watered during the aerosol separation.

* * * * *